United States Patent
Dahm et al.

(12) 
(10) Patent No.: US 6,555,176 B1
(45) Date of Patent: Apr. 29, 2003

(54) SAG STABILIZED COATING COMPOSITIONS CONTAINING EPOXY-FUNCTIONAL CROSSLINKING COMPONENTS

(75) Inventors: Ralf Dahm, Wermelskirchen (DE); Carmen Flosbach, Wuppertal (DE); Hans-Jürgen Gawin, Wuppertal (DE); Hermann Kerber, Wuppertal (DE); Apostolos Manassis, Wuppertal (DE); Volker Paschmann, Essen (DE); Walter Schubert, Wuppertal (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/914,219

(22) PCT Filed: Feb. 25, 2000

(86) PCT No.: PCT/EP00/01566

§ 371 (c)(1),
(2), (4) Date: Aug. 22, 2001

(87) PCT Pub. No.: WO00/52107

PCT Pub. Date: Sep. 8, 2000

(30) Foreign Application Priority Data

Feb. 27, 1999 (DE) .......................... 199 08 627

(51) Int. Cl.$^7$ .............................. C08J 5/00; B05D 1/36; B05D 7/16
(52) U.S. Cl. .................... 427/407.1; 427/410; 523/463; 523/400
(58) Field of Search ................................. 523/400, 463; 524/474, 481, 484, 502, 560, 561, 612, 802; 427/402, 407.1, 409, 410

(56) References Cited

U.S. PATENT DOCUMENTS 5,686,532 A    11/1997  Bederke et al.

FOREIGN PATENT DOCUMENTS

EP     0317184 A2    5/1989
EP     0 351966 A1   1/1990

Primary Examiner—Bret Chen
Assistant Examiner—William Phillip Fletcher, III
(74) Attorney, Agent, or Firm—Sudhir G. Deshmukh

(57) ABSTRACT

Coating composition containing a binder/crosslinking agent system, organic solvents, optionally together with pigments and/or extenders and conventional lacquer additives, wherein the binder/crosslinking agent system contains A) 20 to 80 wt. % of carboxy-functional (meth)acrylic copolymers and/or polyesters which are dissolved in the continuous phase of the coating composition, with an acid value of 15 to 300 mg of KOH/g, B) 80 to 20 wt. % of epoxy-functional crosslinking agents, wherein the numerical ratio between the component A) carboxyl groups and the component B) epoxy groups is between 1:1 and 1:3, and the epoxy-functional crosslinking agent B) comprises at least one epoxy-functional crosslinking component B1) which is dissolved in the continuous phase of the coating composition and at least one epoxy-functional component B2) dispersed in the continuous phase of the coating composition, wherein the numerical ratio of the epoxy groups of the crosslinking components B1) and B2) is 10:1 to 1:5 and wherein the organic solvents comprise 0 to 35 wt. % of one or more conventional organic lacquer solvents containing oxygen and 65 to 100 wt. % of one or more conventional lacquer hydrocarbons.

17 Claims, No Drawings

SAG STABILIZED COATING COMPOSITIONS CONTAINING EPOXY-FUNCTIONAL CROSSLINKING COMPONENTS

This invention relates to coating compositions and to the use-thereof in the production of multilayer lacquer coatings, for example in the motor vehicle sector, in particular in the production of two layer coatings of the base lacquer/clear lacquer type.

Coating compositions which cure by forming esters and are based on a combination of epoxy-functional components and carboxy-functional components are known. They are distinguished by the good resistance to chemicals and acids of the stoved coatings produced therefrom and are thus particularly suitable as clear or topcoat lacquers in automotive original lacquer coating.

When producing base lacquer/clear lacquer two layer lacquer coatings, it is desirable to use clear lacquer coating compositions which are stabilised against sagging, in particular on vertical surfaces during the stoving operation.

WO 95/27012 discloses non-aqueous coating compositions based on a film-forming polymeric polyepoxide and a polyacid as crosslinking agent, which coatings are stabilised against sagging because they contain a colloidal dispersion of carboxy-functional polymer microparticles. The coating compositions may be used as clear lacquer coating compositions for overcoating base lacquer layers.

The storage stability of the coating compositions known from WO 95/27012 is dependent upon the solvent composition; satisfactory storage stability values are only obtained with formulations having a high polarity of the solvent composition. For example the solvent compositions substantially consist of polar solvents. However, when base lacquer layers are overcoated with clear lacquer coating compositions which comprise a polar solvent composition, the base lacquer layer often suffers solvent attack. Negative consequences of solvent attack are, for example, alteration of shade, mottling, impairment of the metallic or pearlescent effect of the resultant two layer lacquer coating.

The object of the present invention is to provide coating compositions cross-linkable by the reaction of carboxyl and epoxy groups, which coating compositions exhibit the advantages of a coating composition stabilised against sagging by a content of polymer microparticles, are stable in storage and nevertheless exhibit only slight solvent attack characteristics towards coating layers overcoated therewith. The coating compositions should in particular be usable as clear lacquer coating compositions for the production of base lacquer/clear lacquer two layer lacquer coatings by overcoating base lacquer layers, as are in particular conventional in automotive lacquer coating.

This object is achieved by curable coating compositions containing a binder/cross-linking agent system, one or more organic solvents, optionally together with pigments and/or extenders and optionally further conventional lacquer additives, wherein the binder/crosslinking agent system contains 20 to 80 wt. % of one or more dissolved carboxy-functional components A) selected from among carboxy-functional (meth)acrylic copolymers and/or carboxy-functional polyesters, the carboxy-functionality of which in each case corresponds to an acid value of 15 to 300 mg of KOH/g, and 20 to 80 wt. % of epoxy-functional crosslinking components B), wherein the weight percentages add up to 100 wt. % and wherein the crosslinking ratio between the component A) carboxyl groups and the component B) epoxy groups is between 1:1 and 1:3, characterised in that the epoxy-functional components B) comprise at least one epoxy-functional crosslinking component B1) which is dissolved in the continuous phase of the coating composition and at least one epoxy-functional component B2) dispersed in the continuous phase of the coating composition, wherein the ratio of the epoxy groups originating from the epoxy-functional components B1) and B2) is between 10:1 and 1:5, and wherein the organic solvents present in the ready-to-apply coating composition comprise 0 to 35 wt. % of one or more conventional organic lacquer solvents containing oxygen and 65 to 100 wt. % of one or more conventional lacquer hydrocarbons, wherein the weight percentages add up to 100 wt. %.

The solvent or solvent mixture which adds up to 100 wt. % and consists of 0 to 35 wt. % of conventional organic lacquer solvents containing oxygen and 65 to 100 wt. % of one or more conventional lacquer hydrocarbons is hereinafter denoted F).

The binder/crosslinking agent system of the coating compositions according to the invention contains components A), B1) and B2) as substantial components, optionally together with the optional components C), D) and/or E) explained below. For example, the coating compositions according to the invention may contain only components A), B1) and B2) as the binder/crosslinking agent system, or the binder/crosslinking agent system of the coating compositions according to the invention additionally contains the optional components C), D) and/or E).

The resin solids content of the coating compositions according to the invention comprises the sum of the resin solids contents or of the non-volatile fractions of components A), B1), B2) and of the optional components C), D) and E).

Curing of the coating compositions according to the invention is based upon the chemical reaction of the complementarily reactive groups of components A), B1) and B2) which proceeds during stoving; this reaction comprises an addition of the carboxyl groups onto the epoxy groups to form carboxylic acid ester bonds. The coating compositions according to the invention contain one or more carboxy-functional components A). The carboxy-functional component A) of the coating compositions according to the invention comprises carboxy-functional (meth)acrylic copolymers and/or carboxy-functional polyesters, the carboxy-functionality of which in each case corresponds to an acid value of 15 to 300 mg of KOH/g. The carboxy-functional (meth)acrylic copolymers and/or carboxy-functional polyesters may be urethanised and/or be modified by reaction with lactones.

The carboxy-functionalised component A) (meth)acrylic copolymers optionally containing urethane groups and/or modified with lactones preferably exhibit a number average molar mass (Mn) of 1000 to 30000 g/mol. The carboxy-functionalised component A) polyesters optionally containing urethane groups and/or modified with lactones preferably exhibit a calculated molar mass of 500 to 4000 g/mol. The acid value is in each case from 15 to 300 mg of KOH/g, preferably from 30 to 250 mg of KOH/g.

When producing the component A) (meth)acrylic copolymers or polyesters containing carboxyl groups, which may optionally in each case contain urethane groups and/or be modified with lactones, the carboxyl groups may be introduced directly by using structural units containing carboxyl groups. Examples of suitable monomers containing carboxyl groups which may be used for synthesising (meth)acrylic copolymers containing carboxyl groups are unsaturated carboxylic acids, such as for example acrylic, methacrylic, itaconic, crotonic, isocrotonic, aconitic, maleic and fumaric acid, semi-esters of maleic and fulmaric acid as well as carboxyalkyl esters of (meth)acrylic acid, such as for example beta-carboxyethyl acrylate and addition products of hydroxyalkyl (meth)acrylates with carboxylic anhydrides, such as for example phthalic acid mono-2-(meth)acryloyloxyethyl ester.

In the present description and the claims, the term (meth)acrylic is used and means acrylic and/or methacrylic.

When producing component A) (meth)acrylic copolymers or polyesters containing carboxyl groups which optionally contain urethane groups and/or are modified with lactones, it is, however, also possible initially to synthesise a polymer containing hydroxyl groups and optionally also carboxyl groups and to introduce the carboxyl groups entirely or in part in a second stage by reaction with carboxylic anhydrides. When this method is used, it is possible to work with quantity ratios such that sufficient hydroxyl groups optionally remain in order to permit urethanisation.

Carboxylic anhydrides suitable for addition onto the polymers containing hydroxyl groups, which may already contain carboxyl groups, are the anhydrides of di- and polycarboxylic acids, such as for example preferably phthalic, tetrahydro-, methylhexahydro- and hexahydrophthalic anhydride.

Monomers suitable for introducing hydroxyl groups into the component A) (meth)acrylic copolymers optionally containing urethane groups and/or modified with lactones are, for example, hydroxyalkyl (meth)acrylates such as for example hydroxyethyl (meth)acrylate, together with the hydroxypropyl (meth)acrylates, hydroxybutyl (meth) acrylates which are isomeric with regard to the position of the hydroxyl group, and reaction products of (meth)acrylic acid with the glycidyl ester of a carboxylic acid having a tertiary alpha carbon atom. The latter-stated reaction products may be formed before, during or after the polymerisation reaction.

When producing the component A) (meth)acrylic copolymers, it is also possible, in addition to the above-stated monomers, to use further olefinically unsaturated monomers, in particular those which, apart from an olefinic double bond, contain no further functional groups.

Further suitable olefinically unsaturated monomers are for example in particular alkyl esters of (meth)acrylic acid, the alkyl moiety of which contains for example 1 to 20 C atoms or more, such as for example methyl (meth)acrylate, ethyl (meth)acrylate, propyl (meth)acrylate, butyl (meth) acrylate, isopropyl (meth)acrylate, isobutyl (meth)acrylate, tert.-butyl (meth)acrylate, hexyl (meth)acrylate, cyclohexyl (meth)acrylate, 2-ethylhexyl (meth)acrylate, decyl (meth) acrylate or hexadecyl (meth)acrylate.

Examples of further suitable olefinically unsaturated monomers are the alkyl esters of maleic, fumaric, tetrahydrophthalic, crotonic, isocrotonic, vinylacetic and itaconic acid, the alkyl moiety of which contains for example 1 to 20 C atoms or more.

Small proportions of monomers having at least two polymerisable, olefinic double bonds may furthermore also be used. The proportion of these monomers is preferably below 5 wt. %, relative to the total weight of the monomers. Examples of such compounds are hexanediol di(meth) acrylate, ethylene glycol di(meth)acrylate, butanediol di(meth)acrylate, hexamethylene bis(meth)acrylamide, trimethylolpropane tri(meth)acrylate, divinylbenzene and similar compounds.

Another suitable component comprises monovinyl aromatic compounds. They preferably contain 8 to 9 carbon atoms per molecule. Examples of suitable compounds are alpha-methylstyrene and the isomeric methylstyrenes, in particular vinyltoluenes and styrene.

The carboxy-functional component A) (meth)acrylic copolymers are preferably produced by free-radical copolymerisation. It may prove advantageous to apportion some of the monomers with a delay relative to each other.

For the purpose of producing the component A) (meth) acrylic copolymers, the monomers or the mixture of monomers used may contain free-radical initiators. Where free-radical initiators are not present in the monomer mixture, they may be added to the monomer mixture optionally with a slight delay or be separately apportioned. The mixture may then also be post-polymerised for a relatively long period, for example for two or more hours. It is then possible to establish a desired solids content, for example of the order of 30 to 80 wt. %, for example of 50 to 60 wt. %, with a conventional lacquer solvent.

Production proceeds, for example, by free-radical solution polymerisation familiar to the person skilled in the art using, for example, 0.1 to 4 wt. %, relative to the initial weight of monomers, of a free-radical initiator. Examples of free-radical initiators are dialkyl peroxides, diacyl peroxides, hydroperoxides, peresters, peroxydicarbonates, perketals, ketone peroxides; azo compounds, such as 2,2'-azobis(2,4-dimethylvalero-nitrile), azobisisobutyronitrile, C—C cleaving initiators, such as for example benzopinacole derivatives.

The carboxy-functionalised component A) (meth)acrylic copolymers may possibly be urethanised in a further reaction step by reacting the hydroxyl groups of the carboxy-functionalised component A) (meth)acrylic copolymers with mono-, di-, tri- or polyisocyanates. Examples of isocyanates usable for urethanisation are phenyl isocyanate, together with the polyisocyanates stated below by way of example in the description of the additional crosslinking agent D) and the defunctionalisation products thereof obtainable by reaction with quantities of monoalcohols which are substoichiometric relative to the isocyanate content. The quantity of di-, tri- or polyisocyanates used for urethanisation is selected in the manner familiar to the person skilled in the art such that gelation is avoided. It is, of course, also possible to urethanise hydroxy-functional (meth)acrylic copolymers before carboxyl groups are introduced by reaction with acid anhydrides.

The component A) polyesters containing carboxyl groups and which optionally contain urethane groups and/or are modified with lactones may be synthesised using conventional methods from aliphatic and/or cycloaliphatic di-, tri- or more highly hydric alcohols, optionally together with monohydric alcohols, and from aliphatic, aromatic and/or cycloaliphatic carboxylic acids, in particular dicarboxylic acids, together with more highly protic polycarboxylic acids. Examples of suitable alcohols are aliphatic diols, such as ethylene glycol, 1,2-propanediol, 1,3-propanediol, 2,2-diethyl-1,3-propanediol, the isomeric butanediols, 1,5-pentanediol, 3-methyl-1,5-pentanediol, 1,6-hexanediol, 2-ethyl-1,6-hexanediol, 2,2,4-trimethyl-1,6-hexanediol, 1,4-dimethylolcyclohexane, polyhydric aliphatic alcohols, such as glycerol, trimethylolethane, ditrimethylolpropane, trimethylolpropane, pentaerythritol, together with etherification products of diols and polyols, for example di- and triethylene glycol, polyethylene glycol, neopentyl glycol ester of hydroxypivalic acid.

Examples of suitable carboxylic acids are adipic, azelaic, 1,3- and 1,4-cyclohexane-dicarboxylic acid, tetrahydrophthalic, hexahydrophthalic, endomethyltetrahydro-phthalic acid, the isomeric phthalic acids or the anhydrides thereof and the esterifiable derivatives thereof.

Like the already described carboxy-functional component A) (meth)acrylic copolymers, the carboxy-functionalised component A) polyesters may be urethanised. The reaction conditions and the usable polyisocyanates are the same for the (meth)acrylic copolymers. It is possible to introduce the urethane groups by reacting the carboxy- and hydroxy-functional polyesters with mono-, di-, tri- or more highly functional polyisocyanates. It is also possible to introduce the urethane groups during synthesis of the polyesters themselves. This is achieved, for example, by entirely or partially replacing di- or tricarboxylic acids with di- or triisocyanates.

The carboxy-functional component A) (meth)acrylic copolymers and polyesters may be modified by reaction with lactones, for example part or all of the carboxyl groups thereof may be "chain-extended" with a lactone. The same applies to the hydroxyl groups optionally present in the component A) (meth)acrylic copolymers and polyesters. "Chain extension" is achieved by ring-opening attachment of lactone to the carboxyl and/or hydroxyl groups. This gives rise to terminal, exposed carboxyl or hydroxyl groups. Lactones are preferably attached to carboxy-functional component A) (meth)acrylic copolymers and polyesters which contain no OH groups. Attachment of the lactone preferably proceeds as the final synthesis step in the production of the component A) concerned. One example of a particularly preferably used lactone is epsilon-caprolactone.

The curable coating compositions according to the invention contain as the epoxy-functional component B) at least one epoxy-functional crosslinking component B1) dissolved in the continuous phase of the coating composition and at least one disperse epoxy-functional component B2), wherein the ratio of the epoxy groups originating from the epoxy-functional components B1) and B2) is between 10:1 and 1:5, preferably between 10:1 and 1:1.

Component B1) comprises one or more conventional epoxy-functional crosslinking agents. These comprise, for example, compounds having at least two epoxy functions per molecule and a calculated epoxy equivalent weight of for example 200 to 700, preferably of 250 to 500 and in particular of 300 to 400, in each case relative to solid resin. The number average molar mass (Mn) is preferably 200 to 10000 g/mol. The glass transition temperature is preferably −20° C. to 70° C., particularly preferably 0° C. to 50° C. and in particular 5° C. to 40° C. The upper limit is preferably up to 50° C.

Examples of these compounds are conventional di- or polyepoxides, for example polyglycidyl ethers based on diethylene glycol, dipropylene glycol, polypropylene glycol, bisphenol A or triglycidyl ethers of glycerol. Further examples of di- or polyepoxides are those based on di- or polyglycidyl esters. Examples of these are reaction products prepared from 1-hydroxy-2,3-epoxypropane with phthalic or terephthalic acid to form phthalic or terephthalic acid bis(2,3-epoxypropyl ester) or a diglycidyl ether of bisphenol A with trimellitic anhydride to form polyesters, for example having a number average molar mass (Mn) of 500 to 2000.

Preferred components B1) are conventional epoxy-functional (meth)acrylic copolymers, in particular glycidyl (meth)acrylate copolymers. Comonomers which may be selected are, for example, (meth)acrylic acid esters, such as for example methyl, ethyl, butyl, isobutyl, ethylhexyl, cyclohexyl and/or lauryl (meth)acrylate, hydroxyalkyl (meth)acrylates, such as for example hydroxyethyl and/or hydroxypropyl (meth)acrylate, and moreover styrene, vinyltoluene and/or alpha-methylstyrene together with alpha,beta-unsaturated monomers, as have already been described above in component A). The number average molar mass (Mn) may, for example, be between 1000 and 10000, preferably 2000 to 5000. Further copolymerisable epoxy-functional monomers are for example (meth)allyl glycidyl ether, 3,4-epoxy-1-vinyl-cyclohexane, epoxycyclohexyl (meth)acrylate, vinyl glycidyl ether. The copolymers are produced, for example, by free-radical solution polymerisation, which is known to the person skilled in the art and requires no further explanation.

It is also possible to precondense components A) and B1) at least partially in a further reaction step while avoiding gelation. This may, for example, be performed by heating components A) and B1) together. The desired degree of condensation may, for example, be determined from the decrease in the acid value, for example by 2 to 5 mg of KOH/g of solid resin.

The disperse epoxy-functional component B2) comprises a non-aqueous dispersion of polymer microparticles, each bearing two or more epoxy groups. The epoxy groups of the component B2) polymer microparticles serve, together with the epoxy groups of component B1), to crosslink the coating composition according to the invention by addition onto the carboxyl groups of component A). The calculated epoxy equivalent weight of the component B2) polymer microparticles is for example 200 to 700, preferably 250 to 500 and in particular 300 to 450, relative to solids.

The particle sizes of the component B2) polymer microparticles are for example between 200 nm and 2 μm.

The glass transition temperature of the component B2) polymer microparticles is preferably 30° C. to 80° C., particularly preferably 40° C. to 60° C.

The component B2) polymer microparticles preferably comprise epoxy-functional (meth)acrylic copolymers.

The component B2) epoxy-functional (meth)acrylic copolymer microparticles are produced, for example, by free-radical polymerisation, as is familiar to the person skilled in the art. The free-radical copolymerisation preferably proceeds in the presence of initially introduced organic solvent, preferably in an organic solvent or solvent mixture, 70 to 100 wt. % of which consists of conventional aliphatic lacquer hydrocarbons, wherein the optionally absent remainder to 100 wt. % may be selected from among other organic solvents which are constituents of the solvent mixture F).

Epoxy-functional, free-radically polymerisable, olefinically unsaturated monomers (I) and free-radically polymerisable comonomers (II) are, for example, used in the free-radical copolymerisation in quantity ratio such that a calculated epoxy equivalent weight of the component B2) (meth)acrylic copolymer microparticles of for example 200 to 700, preferably of 250 to 500 and in particular of 300 to 450, relative to solids, is obtained.

Epoxy-functional monomers (I) which may, for example, be used are (meth)allyl glycidyl ether, 3,4-epoxy-1-vinylcyclohexane, epoxycyclohexyl (meth)acrylate, vinyl glycidyl ether, but in particular glycidyl (meth)acrylate.

The nature and quantity of the free-radically copolymerisable comonomers (II) are selected such that the finished (meth)acrylate copolymer is insoluble in the continuous phase of the coating composition according to the invention, in particular in the solvent composition of the continuous phase. The finished (meth)acrylic copolymer is in particular insoluble in the solvent or mixture of organic solvents F) and forms polymer microparticles therein.

The monomers (II) which are free-radically copolymerisable with the epoxy-functional, olefinically unsaturated monomers (I) comprise, for example, those which, apart from an olefinic double bond, contain no further functional groups, for example alkyl esters of (meth)acrylic acid the alkyl moiety of which contains for example 1 to 20 C atoms or more, such as for example methyl (meth)acrylate, ethyl (meth)acrylate, propyl (meth)acrylate, butyl (meth)acrylate, isopropyl (meth)acrylate, isobutyl (meth)acrylate, tert.-butyl (meth)acrylate, hexyl (meth)acrylate, (alkyl)cyclohexyl (meth)acrylate, (iso)bornyl (meth)acrylate, 2-ethylhexyl (meth)acrylate, decyl (meth)acrylate, hexadecyl (meth) acrylate, lauryl (meth)acrylate; monovinyl aromatic compounds, such as alpha-methylstyrene, the isomeric methylstyrenes, vinyltoluenes, in particular styrene; alkyl esters of maleic, fumaric, tetrahydrophthalic, crotonic, isocrotonic, vinylacetic and itaconic acid, the alkyl moiety of which contains for example 1 to 20 C atoms or more.

The component B2) polymer microparticles may contain hydroxyl groups, for example corresponding to a hydroxyl value, relative to solids, of up to 60 mg of KOH/g, preferably of between 0 and 40 mg of KOH/g. Comonomers (II) suitable for introducing such a hydroxyl group content into the epoxy-functional component B2) (meth)acrylic copolymers present as polymer microparticles are, for example, hydroxyalkyl (meth)acrylates, such as for example hydroxyethyl (meth)acrylate, hydroxypropyl (meth)acrylates and hydroxybutyl (meth)acrylates isomeric with regard to the position of the hydroxyl group and reaction products of (meth)acrylic acid with the glycidyl ester of a carboxylic acid having a tertiary alpha carbon atom.

The epoxy-functional component B2) (meth)acrylic copolymer microparticles may assume the form of internally crosslinked microgel particles or they may exhibit no or only slight internal crosslinking. In the former case, comonomers (II) having at least two free-radically polymerisable, olefinic double bonds per molecule are used in a proportion of 5 to 30 wt. %, relative to the total weight of the monomers used to produce the microgel particles, while in the latter case the proportion of these monomers is 0 to less than 5 wt. %, relative to the total weight of the monomers used to produce the polymer microparticles exhibiting no or only slight internal crosslinking. Examples of comonomers (II) having at least two free-radically polymerisable, olefinic double bonds are hexanediol di(meth)acrylate, ethylene glycol di(meth)acrylate, butanediol di(meth)acrylate, hexamethylene bis(meth)acrylamide, trimethylolpropane tri(meth) acrylate, divinylbenzene. Further examples are compounds which may be produced by condensation or addition reactions of complementary compounds, which, apart from one or more olefinic double bonds, each contain one or more further functional groups per molecule. The further functional groups of the individual complementary compounds comprise mutually complementarily reactive groups, in particular groups which may react with each other for the purposes of a possible condensation or addition reaction. The condensation or addition reaction may here proceed before, during or after copolymerisation.

Further examples of compounds produced by condensation reactions and containing more than one olefinic double bond are reaction products formed from alkoxysilane-functional (meth)acrylic monomers after hydrolysis with elimination of alcohol and formation of siloxane bridges. Further examples are reaction products formed from hydroxyalkyl (meth)acrylates and olefinically unsaturated isocyanates blocked on the isocyanate group, such as isocyanatoalkyl (meth)acrylate or m-isopropenyl-alpha,alpha-dimethylbenzyl isocyanate with elimination of the blocking agent and formation of urethane groups.

Another example of a compound produced by addition reaction and containing more than one olefinic double bond is the reaction product formed by ring-opening addition of the epoxy group of glycidyl (meth)acrylate onto the carboxyl group of (meth)acrylic acid to form an ester group and a hydroxyl group. Further examples are addition products formed from hydroxyalkyl (meth)acrylates and olefinically unsaturated isocyanates, such as isocyanatoalkyl (meth) acrylate or m-isopropenyl-alpha,alpha-dimethylbenzyl isocyanate to form a urethane group.

The epoxy-functional component B2) (meth)acrylic copolymer microparticles insoluble in the continuous phase of the coating composition according to the invention, in particular in the solvent composition of the continuous phase, are preferably surrounded by a dispersion stabiliser arranged on the surface thereof, preferably covalently bonded thereto. The dispersion stabiliser is soluble in the continuous phase of the coating composition according to the invention, in particular in the solvent composition of the continuous phase. The weight ratio of soluble dispersion stabiliser to insoluble fraction of the component B2) (meth) acrylic copolymer microparticles is for example between 5:95 and 50:50, preferably between Dispersion stabilisers for the purposes of the present invention for example in particular comprise macromers, for example macromonomers, which are soluble in the continuous phase of the coating composition according to the invention, in particular the solvent composition of the continuous phase of the coating composition according to the invention, in particular in a solvent or a mixture of organic solvents F). These are oligomeric or polymeric compounds with a number average molar mass (Mn) of for example 500 to 20000 having one or more olefinic, free-radically polymerisable double bonds per molecule. Examples are oligomeric or polymeric compounds into which one or more olefinic double bonds have been introduced by reacting functional group(s) of the oligomeric or polymeric compounds with groups, complementarily reactive towards the functional group(s), of olefinically mono- or polyunsaturated compounds. In the case of oligomeric or polymeric compounds having two or more functional groups, all or only part of the functional groups may be reacted with the complementarily reactive groups of the low molecular weight, olefinically mono- or polyunsaturated compounds. A covalent bond is formed between a functional group and group complementarily reactive thereto by a condensation or addition reaction. For example, the same condensation or addition reactions as have been described by way of example above in relation to the comonomers (II) having at least two free-radically polymerisable, olefinic double bonds may be taken into consideration.

One example of a usable dispersion stabiliser is the reaction product of poly-12-hydroxystearic acid and glycidyl (meth)acrylate.

(Meth)acrylic copolymers are preferred as dispersion stabilisers. Preferred examples thereof are suitably functionalised (meth)acrylic copolymers, the functional groups of which have been partially or completely reacted with complementarily reactive groups of low molecular weight, olefinically mono- or polyunsaturated compounds, for example (meth)acrylic acid copolymers reacted with glycidyl (meth)acrylate, glycidyl (meth)acrylate copolymers reacted with (meth)acrylic acid, isocyanate-functional (meth)acrylic copolymers reacted with hydroxyalkyl (meth) acrylate or hydroxyalkyl (meth)acrylate copolymers reacted with isocyanatoalkyl (meth)acrylate. The (meth)acrylic copolymers preferred as dispersion stabilisers contain, apart from the monomer units optionally comprising unreacted functional groups and the monomer units modified with olefinically unsaturated groups, a proportion of for example 60 to 99 wt. %, preferably of 70 to 95 wt. %, particularly preferably of 70 to 90 wt. % of non-functional monomer units. In this manner, the solubility of the (meth)acrylic copolymer dispersion stabiliser in the solvent composition of the continuous phase of the coating composition according to the invention, in particular in the solvent or solvent mixture F), is ensured. The non-functional monomers preferably comprise (meth)acrylic acid alkyl esters having 4 to 18 C atoms in the alkyl moiety, for example butyl (meth) acrylate, isobutyl (meth)acrylate, tert.-butyl (meth)acrylate, hexyl (meth)acrylate, (C1-C12-alkyl)cyclohexyl (meth) acrylate, (iso)bornyl (meth)acrylate, 2-ethylhexyl (meth) acrylate, decyl (meth)acrylate, hexadecyl (meth)acrylate, lauryl (meth)acrylate.

The calculated epoxy equivalent weight of the epoxy-functional component B2) (meth)acrylic copolymer microparticles, which comprise a dispersion stabiliser arranged on the surface thereof, preferably covalently bonded thereto, is for example 200 to 700, preferably 250 to 500 and in particular 300 to 450, relative to solids (sum of solids contents of soluble dispersion stabiliser and insoluble polymer microparticles).

The free-radical copolymerisation to produce the epoxy-functional component B2) (meth)acrylic copolymer microparticles, which comprise a dispersion stabiliser covalently bonded to the surface thereof, may be performed, for example, by initially introducing an organic solution of the copolymerisable dispersion stabiliser and apportioning the mixture of the monomers (I) and (II). Preferably, however, only organic solvent is initially introduced, preferably an organic solvent mixture, 0 to 20 wt. % of which consists of conventional organic lacquer solvents containing oxygen, preferably selected from among ketones, esters, alcohols, ether esters, ethers, ether alcohols and/or ester alcohols. 0 to 30 wt. % consists of conventional aromatic and/or aralipathic lacquer hydrocarbons and 70 to 100 wt. % consists of conventional aliphatic and/or cycloaliphatic lacquer hydrocarbons, wherein the weight percentages add up to 100 wt. %, and the monomer mixture and the copolymerisable dispersion stabiliser are apportioned and free-radically copolymerised. The monomer mixture and dispersion stabiliser may here also be apportioned as a mixture. Obviously, an organic solution of a proportion of the copolymerisable dispersion stabiliser may also be initially introduced and the remainder of the copolymerisable dispersion stabiliser apportioned.

The epoxy-functional component B2) (meth)acrylic copolymer microparticles are preferably produced by free-radical copolymerisation of the monomers (I) and (II) in the presence of a copolymerisable (meth)acrylic copolymer macromer as dispersion stabiliser, particularly preferably of an epoxy-functional (meth)acrylic copolymer macromer. The epoxy-functional (meth)acrylic copolymer macromers may in particular be obtained by reacting an epoxy-functional (meth)acrylic copolymer with a sub-stoichiometric quantity, relative to the epoxy groups, of (meth)acrylic acid for the purpose of introducing olefinic double bonds and forming the macromeric dispersion stabiliser.

Particularly preferred epoxy-functional component B2) (meth)acrylic copolymer microparticles may be produced by a synthesis sequence described below. An epoxy-functional (meth)acrylic copolymer is initially produced by free-radical copolymerisation of a proportion or the entire quantity of the epoxy-functional monomers (I) used to produce the component B2) (meth)acrylic copolymer microparticles and a proportion of the monomers (II) used to produce the component B2) (meth)acrylic copolymer microparticles. In this manner, (meth)acrylic copolymers having a calculated epoxy equivalent weight of for example 300 to 3000 and a number average molar mass (Mn) of 1500 to 5000 are preferably obtained. The resultant, organically dissolved, epoxy-functional (meth)acrylic copolymer is reacted with a sub-stoichiometric quantity, relative to the epoxy groups, of (meth)acrylic acid. Some of the epoxy groups are consumed in this reaction. Once this addition is complete, an organic solution of a (meth)acrylic copolymer macromer comprising epoxy groups is obtained, which is copolymerised with the optionally still remaining proportion of the epoxy-functional monomers (I) used to produce the component B2) (meth) acrylic copolymer microparticles and the remaining proportion of the monomers (II) used to produce the component B2) (meth)acrylic copolymer microparticles to form epoxy-functional component B2) (meth)acrylic copolymer microparticles, on the surface of which there remain covalently bonded residues of the dispersion stabiliser. The epoxy groups may thus be a constituent of the dispersion stabiliser residues alone or may be a constituent of the dispersion stabiliser residues and of the actual (meth)acrylic copolymer microparticles.

When preparing the coating compositions according to the invention, the quantity ratios are selected such that there prevails between component A) containing carboxyl groups and components B1) and B2) containing epoxy groups a molar ratio of carboxyl to epoxy groups of 1:1 to 1:3, preferably of 1:1.2 to 1:2.5. The ratio of the epoxy groups originating from the epoxy-functional components B1) and B2) is between 10:1 and 1:5, preferably between 10:1 and 1:1.

The coating compositions according to the invention may contain, in each case relative to solids content, 0 to 30 wt. %, for example 5 to 30 wt. %, of one or more polymer polyols C), relative to the sum of solid contents by weight of components A), B1) and B2).

The polymer polyols C) may, for example, comprise polymer polyols selected from among hydroxy-functional polyesters, polyurethanes and/or (meth)acrylic copolymers which differ from components A) optionally containing hydroxyl groups. The polymer polyols C) used in the coating compositions according to the invention exhibit, for example, a number average molar mass (Mn) of 500 to 10000. The polymer polyols C) have at least two hydroxyl functions per molecule. In addition to the hydroxyl groups corresponding to a hydroxyl value of for example 30 to 350 mg of KOH/g, the polymer polyols C) may also contain carboxyl groups corresponding to an acid value of 0 to 15 mg of KOH/g. Apart from the hydroxyl groups and the optionally present carboxyl groups, the polymer polyols C) preferably contain no further functional groups, in particular no epoxy groups.

In addition to components A), B1), B2) and C), the coating compositions according to the invention may also contain one or more additional crosslinking agents D) differing from epoxy components B1) and B2), which crosslinking agents permit additional crosslinking in particular including hydroxyl groups, for example the hydroxyl groups present in the binder system and/or formed during stoving in the course of the epoxy/carboxyl addition reaction. The additional crosslinking agents D) are present in quantities of 0 to 20 wt. % in total, relative to the sum of components A), B1), B2) and C), in each case relative to solids content.

Examples of additional crosslinking agents D) are conventional lacquer amino plastic resins, in particular melamine resins. Examples are butanol-, isobutanol- and/or methanol-etherified melamine resins.

Further examples of additional crosslinking agents D) are triazine-based components which crosslink by forming ester groups, in particular by forming urethane groups (carbamic acid ester groups), such as for example preferably tris(alkoxycarbonyl-amino)triazine.

Further examples of additional crosslinking agents D) are conventional blocked lacquer polyisocyanates which may be produced from free polyisocyanates by reaction with compounds containing an active hydrogen atom which may be redissociated under stoving conditions.

Examples of usable polyisocyanates are in particular cycloaliphatic and aliphatic diisocyanates such as tetramethylene diisocyanate, hexamethylene diisocyanate, 2,2,4-trimethylene diisocyanate, 1,3- and 1,4-cyclohexane diisocyanate, isophorone diisocyanate, biscyclohexylmethane diisocyanate as well as polyisocyanates derived therefrom, for example of the type containing biuret, isocyanurate, uretidione, carbodiimide, urethane and/or allophanate groups.

Known polyisocyanates which are conventionally used in lacquer production are particularly suitable, for example modification products comprising biuret, isocyanurate or urethane groups of the above-stated simple polyisocyanates, in particular tris(6-isocyanatohexyl)biuret, the isocyanurate derived from isophorone diisocyanate or hexane diisocyanate or low molecular weight polyisocyanates comprising urethane groups, as may be obtained by reacting an excess of isophorone diisocyanate with simple polyhydric alcohols of the molecular weight range from 62 to 300, in particular with trimethylolpropane.

Conventional capping agents are used, for example compounds with an active hydrogen atom, selected from among CH-acidic compounds such as acetylacetone, acetoacetic acid alkyl esters, malonic acid dialkyl esters; alcohols; oximes such as methyl ethyl ketoxime; lactams such as epsilon-caprolactam; derivatives of imidazole or pyrazole.

Further examples of additional crosslinking agents D) which may be present in the coating compositions according to the invention are organic compounds comprising at least two cyclic carboxylic anhydride groups per molecule. The carboxylic anhydride group content (formally calculated as $C_4O_3$, molecular weight=96) of these compounds is preferably 5 to 88 wt. %, particularly preferably 6 to 30 wt. %. Suitable compounds are, for example, trimellitic anhydride esters of ethylene glycol, propylene glycol, diethylene glycol, triethylene glycol, neopentyl glycol, glycerol or trimethylol-propane, preferably produced in a ratio of 1 mol of trimellitic anhydride per mol of hydroxyl groups.

Further suitable polyanhydrides are, for example, benzophenonetetracarboxylic anhydride and 1,2,4,5-benzenetetracarboxylic dianhydride.

Preferred polyanhydrides are copolymers of olefinically unsaturated monomers which contain on a statistical average at least two cyclic carboxylic anhydride groups per molecule. These preferably comprise copolymers of maleic anhydride and/or itaconic anhydride with conventional comonomers as are for example described in connection with component A).

The coating compositions according to the invention may furthermore contain 0 to 10 wt. % of one or more monoepoxy compounds E), relative to the sum of components A), B1) and B2), in each case relative to solids. These comprise substances which are substantially non-volatile under stoving conditions, the volatile fraction for example preferably being below 1 wt. %, relative to the total quantity of monoepoxide E). The molar masses of the monoepoxides E) are greater than 150 and such compounds having a number average molar mass of up to 3000 are preferred, particularly preferably those with a molar mass of below 1000.

Examples of such compounds are, for example, reaction products prepared from a diglycidyl compound, for example a diglycidyl ether, such as one mol of bisphenol A diglycidyl ether and one mol of a saturated or unsaturated monocarboxylic acid such as acetic acid, propionic acid or isononanoic acid. Further examples are reaction products of di- or polyepoxides, such as for example polyglycidyl ethers based on diethylene glycol, dipropylene glycol, polypropylene glycol with a number average molar weight (Mw) of up to 2000 and triglycidyl ethers of glycerol and/or polyphenols such as bisphenol A or F with the stated monocarboxylic acids.

The glycidyl ester of versatic acid is particularly preferred.

In the ready-to-apply state, the coating compositions according to the invention for example exhibit a solids content, comprising the resin solids together with optionally present further non-volatile constituents (such as for example pigments, extenders, additives), of 40 to 70 wt. %. The remainder of for example 30 to 60 wt. % is formed by volatile constituents, organic solvents, which may be separately added during production of the coating compositions according to the invention and/or originate as a constituent of other components used during the production of the coating compositions according to the invention, for example the binder/crosslinking system.

The organic solvents comprise those as are conventional in the production of coating compositions, wherein the organic solvents present in the ready-to-apply coating composition preferably comprise a solvent mixture F).

The solvents or solvent mixtures F) comprise 0 to 35 wt. % of one or more conventional organic lacquer solvents containing oxygen and 65 to 100 wt. % of conventional lacquer hydrocarbons, wherein the weight percentages add up to 100 wt. %. Apart from conventional aromatic, araliphatic, aliphatic and cycloaliphatic lacquer hydrocarbons, the term conventional lacquer hydrocarbons here also includes conventional terpene lacquer hydrocarbons. Preferred solvent mixtures F) comprise 0 to 35 wt. % of conventional organic lacquer solvents containing oxygen, 50 to 90 wt. % of conventional aromatic and/or araliphatic lacquer hydrocarbons and 5 to 30 wt. % of conventional aliphatic and/or cycloaliphatic lacquer hydrocarbons, wherein the weight percentages add up to 100 wt. %. Particularly preferred solvent mixtures F) comprise 5 to 30 wt. % of conventional organic lacquer solvents containing oxygen, 55 to 80 wt. % of conventional aromatic and/or araliphatic lacquer hydrocarbons and 5 to 20 wt. % of conventional aliphatic lacquer hydrocarbons, wherein the weight percentages add up to 100 wt. %.

The conventional organic lacquer solvents containing oxygen present in the ready-to-apply coating compositions according to the invention preferably comprise solvents containing solely carbon, hydrogen and oxygen, preferably selected from among ketones, esters, alcohols, ether esters, ethers, ether alcohols and/or ester alcohols. Examples of selectable ketones are methyl ethyl ketone, diethyl ketone, methyl isobutyl ketone, ethyl amyl ketone, methyl isoamyl ketone, diisobutyl ketone, cyclo-hexanone, isophorone. Examples of selectable esters are butyrolactone, propylene carbonate, ethyl acetate, (iso)butyl acetate, (iso)amyl acetate, propylene glycol diacetate, with butyl acetate being preferred. Examples of selectable alcohols are mono- and dialcohols such as methanol, ethanol, n- and isopropanol, n- and isobutanol, 2-ethylhexanol, cyclohexanol, benzyl alcohol, isodecanol, isononyl alcohol, isotridecyl alcohol, ethylene glycol, propylene glycol, diethylene glycol, dipropylene glycol, triethylene glycol, hexylene glycol, propylene glycol, diethylene glycol, dipropylene glycol, triethylene glycol, hexylene glycol, with selection preferably being made from among n-butanol and/or isodecanol. Examples of selectable ether esters are ethylene glycol monoethyl ether acetate, ethylene glycol monobutyl ether acetate, ethylene glycol monomethyl ether acetate, 3-methoxy-n-butyl acetate, diethylene glycol monobutyl ether acetate, methoxypropyl acetate, dipropylene glycol methyl ester, ethylethoxy propionate, ethoxypropyl acetate, with selection preferably being made from among methoxypropyl acetate, ethylene glycol monobutyl ether acetate, diethylene glycol monobutyl ether acetate and/or dipropylene glycol methyl ester. Examples of selectable ethers are diethylene glycol dimethyl ether, dipropylene glycol dimethyl ether, ethylene glycol dimethyl ether, propylene glycol dimethyl ether, with dipropylene glycol dimethyl ether being preferred. Examples of selectable ether alcohols are ethylene glycol monobutyl ether, butoxypropanol, diethylene glycol monobutyl ether, dipropylene glycol monomethyl ether, dipropylene glycol butyl ether, ethylene glycol monoethyl ether, diethylene glycol monoethyl ether, triethylene glycol monoethyl ether, ethoxypropanol, ethylene glycol monohexyl ether, ethylene glycol monoisopropyl ether, methoxypropanol, methoxybutanol, ethylene glycol monomethyl ether, diethylene glycol monomethyl ether, with selection preferably being made from among ethylene glycol monobutyl ether, diethylene glycol monobutyl ether, dipropylene glycol butyl ether and/or methoxypropanol. Examples of ester alcohols are ethylene glycol acetate, glycolic acid butyl ester, Texanol®. Examples of further conventional organic lacquer solvents containing oxygen are diacetone alcohol, methoxyhexanone.

Examples of aromatic and araliphatic hydrocarbons are xylene, toluene, tetralin and mixtures of aromatic or araliphatic hydrocarbons of a boiling range from 150 to 270° C., with xylene and hydrocarbon mixtures of a boiling range from 150 to 210° C. being preferred.

Examples of aliphatic hydrocarbons are n-heptane, isoheptane, cyclohexane, together with mixtures of aliphatic hydrocarbons of a boiling range from 60 to 250° C., for example naphtha and kerosine fractions.

Examples of terpene hydrocarbons are dipentene, pine oil, turpentine and mixtures of terpene hydrocarbons of a boiling range from 160 to 220° C.

If the coating compositions according to the invention are to be used as pigmented topcoat lacquers, for example in the production of the outer topcoat of a multilayer lacquer coating, they contain pigments and optionally extenders. The ratio by weight of pigment plus extender to resin solids content is here for example in the range between 0.05–2:1, wherein the resin solids contents includes components A), B), C), D) and E). Examples of pigments are inorganic and/or organic coloured pigments and/or effect pigments, such as for example titanium dioxide, iron oxide pigments, carbon black, azo pigments, phthalocyanine pigments, quinacridone pigments, metal pigments, for example made from titanium, aluminium or copper, interference pigments, such as for example aluminium coated with titanium dioxide, coated mica, graphite effect pigments, lamellar iron oxide, lamellar copper phthalocyanine pigments. Examples of extenders are conventional lacquer extenders, such as for example talcum or silicates.

The coating compositions according to the invention usable as pigmented topcoat lacquers or preferably as clear lacquers may furthermore contain conventional lacquer additives in the quantities conventional in lacquers, for example 0 to 5 wt. %, relative to the complete lacquer, for example transparent pigments or extenders, levelling agents, reactive diluents, dyes, light stabilisers, antioxidants or further rheological control agents which may be used as well as the epoxy-functional polymer microparticles B2), such as for example disubstituted ureas, compounds which release formaldehyde at the latest during stoving, catalysts to catalyse the reaction of carboxyl and epoxy groups and/or to catalyse the optionally possible additional crosslinking reaction.

The coating compositions according to the invention may be applied using known methods, in particular by spraying, to film thicknesses of for example 25 to 60 μm. After a flashing off phase, the applied coating composition is crosslinked by heating. Stoving temperatures are, for example, 60 to 180° C., preferably 60 to 160° C.

The coating compositions according to the invention may be used, for example, to produce the outer pigmented topcoat layer of a multilayer lacquer coating. In this respect, the present invention also relates to the use of the coating compositions according to the invention as topcoat lacquer coating compositions.

The coating compositions according to the invention are preferably formulated as transparent clear lacquers which may be used to produce the outer clear lacquer layer of a multilayer lacquer coating. In this respect, the present invention also relates to the use of the coating compositions according to the invention as clear lacquer coating compositions. The clear lacquer coating composition according to the invention may, for example, be applied onto a substrate to which a single or multilayer coloured or effect coating has been applied and be stoved. Stoving temperatures of the clear lacquer coating compositions according to the invention are for example between 60 and 160° C. In automotive applications, stoving temperatures are for example between 60 and 140, and in particular between 80 and 140 and preferably between 110 and 130° C. for applications in automotive original lacquer coating.

The clear lacquer coating compositions according to the invention are preferably used to produce a base lacquer/clear lacquer multilayer lacquer coating. In this case, a coloured or effect base lacquer layer is applied onto an optionally precoated substrate, in particular onto precoated automotive bodies or parts thereof, before the clear lacquer layer of a clear lacquer coating composition according to the invention is applied and stoved.

The colour and/or effect base lacquer layer may be stoved before application of the clear lacquer layer of the clear lacquer coating composition according to the invention, but the clear lacquer coating composition according to the invention is preferably applied using the known wet-on-wet process onto the base lacquer layer which determines the shade of the multilayer lacquer coating. The base lacquer layer is here applied by spraying a colour and/or effect aqueous or solvent-based base lacquer to a dry film thickness dependent upon the shape, for example of between 10 and 25 μm. Once the base lacquer layer has been applied and after a brief flashing off phase, for example at 20 to 80° C., the clear lacquer layer of the clear lacquer coating composition according to the invention is applied for example by spraying for example to a dry film thickness of generally between 25 and 50 μm. A brief flashing off period may follow. The substrate is then introduced into the stoving process in which the clear lacquer coating composition is stoved together with the base lacquer layer at elevated temperatures of for example 60 to 160° C.

The coating compositions according to the invention are stable in storage and are distinguished by favourable processing characteristics. They are resistant to sagging during curing, in particular during stoving. Base lacquer layers overcoated with the clear lacquer coating compositions according to the invention using the wet-on-wet process suffer virtually no or no solvent attack.

Using the present invention, it is possible to produce multilayer lacquer coatings, in particular base lacquer/clear lacquer two layer lacquer coatings, in particular on motor vehicles and the parts thereof, which have outstanding optical/aesthetic properties, good resistance to weathering and good resistance to chemicals and acids.

EXAMPLE 1

Production of a carboxy-functional polyester a) Production of a Hydroxy-functional Polyester Oligomer:

1100 g of trimethylolpropane and 899 g of adipic acid are melt-esterified in the presence of 2 g of hypophosphoric acid at 180° C. to 240° C. until an acid value of 0.5 mg of KOH/g is obtained. The mixture is then diluted with 770 g of a mixture of aromatic hydrocarbons (boiling range 155° C.–178° C.).

The product has a stoving residue of 64.5% (1 h, 150° C.) and a hydroxyl value of 390 mg of KOH/g, relative to solids content.

b) Carboxy-functionalisation of the Hydroxy-functional Polyester Oligomer:

878 g of the product from Example 1a), 622 g of hexahydrophthalic anhydride and 277 g of a mixture of aromatic hydrocarbons (boiling range 155° C.–178° C.) are heated to 80° C. Once the exothermic reaction has subsided, the mixture is heated to 140° C. and the reaction performed until the desired acid value is obtained. 100 g of epsilon-caprolactone are then added. The reaction is performed at 140° C. until the theoretical solid content is obtained.

The carboxy-functional polyester resin has a stoving residue of 67.7% (1 h, 150° C.) and an acid value of 190 mg of KOH/g, relative to solids content.

EXAMPLE 2

Production of Carboxy-functional Methacrylic Copolymer Microparticles a) 197 parts of a mixture of aromatic hydrocarbons (boiling range 155–178° C.) are initially introduced and heated to 140° C. Within 5 hours, a mixture of 60 parts of acrylic acid, 295 parts of ethylhexyl methacrylate, 189 parts of cyclohexyl methacrylate, 47.3 parts of lauryl acrylate, 10 parts of a mixture of aliphatic hydrocarbons (boiling range 140–165° C.), 1.4 parts of dicumyl peroxide and 2.9 parts of di-tert.-butyl peroxide are continuously added dropwise. Any residues are then flushed through with 30 parts of the mixture of aliphatic hydrocarbons and the reaction mixture is post-polymerised for 4 h at 150° C. Once a further 158 parts of the mixture of aliphatic hydrocarbons have been added, 10 parts of glycidyl methacrylate and 0.2 parts of 2,6-di-tert.-butyl-4-methylphenol are added at 140° C. and reacted until the epoxy groups have been consumed.

b) 15 parts of a mixture of aromatic hydrocarbons (boiling range 155–178° C.), 24 parts of n-butanol and 114 parts of a mixture of aliphatic hydrocarbons (boiling range 140–165° C.) are initially introduced and heated to 100° C. Within 3 hours, a mixture of 132 parts of methyl methacrylate, 47.4 parts of acrylic acid, 25 parts of styrene, 25 parts of hydroxypropyl methacrylate, 115 parts of resin solution 2a), 60 parts of the mixture of aliphatic hydrocarbons, 15.6 parts of n-butanol and 1.3 parts of 2,2-azo-bis(2-methylbutanenitrile) are continuously added dropwise. The mixture is stirred for a further 30 min at 100° C.

EXAMPLE 3

Production of Epoxy-functional Methacrylic Copolymer Microparticles a) 292 parts of a mixture of aromatic hydrocarbons (boiling range 155–178° C.) are initially introduced and heated to 140° C. Within 5 h, a mixture of 175 parts of glycidyl methacrylate, 350 parts of ethylhexyl methacrylate, 280 parts of cyclohexyl methacrylate, 70 parts of lauryl methacrylate, 14.6 parts of a mixture of aliphatic hydrocarbons (boiling range 140–165° C.), 2.2 parts of dicumyl peroxide and 4.4 parts of di-tert.-butyl peroxide are continuously added dropwise. Any residues are then flushed through with 44 parts of the mixture of aliphatic hydrocarbons and the reaction mixture is post-polymerised for 4 h at 150° C. Once a further 234 parts of the mixture of aliphatic hydrocarbons have been added, 15 parts of acrylic acid and 0.3 parts of 2,6-di-tert.-butyl-4-methylphenol are added at 130° C. and the reaction continued until an acid value of <0.6 mg of KOH/g has been achieved.

b) 6.5 parts of a mixture of aromatic hydrocarbons (boiling range 155–178° C.), 8 parts of n-butanol and 52 parts of a mixture of aliphatic hydrocarbons (boiling range 140–165° C.) are initially introduced and heated to 100° C. Within 3 hours, a mixture of 50 parts of methyl methacrylate, 41 parts of glycidyl methacrylate, 11 parts of styrene, 50 parts of resin solution 3a), 26 parts of the mixture of aliphatic hydrocarbons, 7 parts of n-butanol and 0.6 parts of 2,2-azobis(2-methylbutanenitrile) are continuously added dropwise. The mixture is stirred for a further 30 min at 100° C.

EXAMPLE 4

Production of Epoxy-functional Methacrylic Copolymer Microparticles 15 parts of a mixture of aromatic hydrocarbons (boiling range 155–178° C.), 24 parts of n-butanol and 114 parts of a mixture of aliphatic hydrocarbons (boiling range 140–165° C.) are initially introduced and heated to 100° C. Within 3 hours, a mixture of 101 parts of methyl methacrylate, 94 parts of glycidyl methacrylate, 25 parts of styrene, 12 parts of hydroxypropyl methacrylate, 115 parts of resin solution 3a), 60 parts of the mixture of aliphatic hydrocarbons, 16 parts of n-butanol and 1.3 parts of 2,2-azobis(2-methylbutanenitrile) are continuously added dropwise. The mixture is stirred for a further 30 minutes at 100° C.

EXAMPLE 5a–d

Production of Clear Lacquers and Production of Multilayer Lacquer Coatings

Clear Lacquers with the Composition Stated in Table 1 are Produced.

Metal sheets provided with a cataphoretic primer and surfacer layer are spray coated to a dry film thickness of 15 μm with a silver-coloured base lacquer and predried for 10 minutes at 80° C. Clear lacquers 5a–d are each sprayed onto the suspended metal sheets in a wedge shape to a dry film thickness of 10 to 60 μm. After flashing off for 5 minutes at room temperature, the coatings are stoved for 20 minutes at 140° C. (object temperature). The metal sheets are in a vertical position during all operations.

High gloss multilayer lacquer coatings without any signs of solvent attack of the effect base lacquer are obtained in each case.

Table 1 shows, in addition to the composition of the clear lacquers, their respective sag limits and storage stability.

TABLE 1

| Constituents (parts by weight) | 5 a (comp.) | 5b (comp.) | 5c (invention) | 5d (invention) |
|---|---|---|---|---|
| Resin solution from Example 1 | 202 | 128 | 202 | 202 |
| A[1] | 489 | 489 | 416 | 416 |
| B[2] | — | 96 (Example 2) | 96 (Example 3) | 96 (Example 4) |
| Melamine resin[3] | 70 | 70 | 70 | 70 |
| Light stabiliser[4] | 20 | 20 | 20 | 20 |
| Levelling agent[5] | 5 | 5 | 5 | 5 |
| Methoxypropanol | 25 | 25 | 25 | 25 |
| Dipropylene glycol dimethyl ether | 15 | 15 | 15 | 15 |
| Butanol | 45 | 45 | 45 | 45 |
| Solvesso 100 | 129 | 129 | 129 | 129 |
| Clear lacquer sag limit (μm) | 31 | 37 | 43 | 39 |
| Storage stability[6] | >6 weeks | 4 days | >6 weeks | >6 weeks |

[1]69 wt. % solution of an epoxy-functional methacrylic copolymer (monomer weight ratio: 5% tert.-butyl acrylate, 12% butanediol monoacrylate, 20% styrene, 26% ethylhexyl methacrylate, 37% glycidyl methacrylate; number average molecular weight (Mn) = 4000 in a 9:1 mixture of Solvesso 100 (mixture of aromatic hydrocarbons with a boiling range of 155 to 185° C.) and n-butanol),
[2]methacrylic copolymer particles from Examples 2, 3 and 4,
[3]70 wt. % of a butylated melamine resin in n-butanol,
[4]1:1 mixture a benzotriazole derivative and a sterically hindered amine (HALS type),
[5]silicone oil.
[6]Samples of the clear lacquers left to stand at 20° C. were observed for the onset of phase separation.

What is claimed is:

1. A coating composition comprising a binder/crosslinking agent system and one or more organic solvents, wherein the binder/crosslinking agent system comprises:
   (A) 20–80 wt. % of at least one carboxy-functional component selected from the group consisting of carboxy-functional (meth)acrylic copolymers and carboxy-functional polyesters, said carboxy-functionality corresponding to an acid value of 15 to 300 mg of KOH/g, wherein said carboxy-functional components are dissolved in a continuous phase of the coating composition, and wherein said carboxy-functional components are urethanised and/or modified by a reaction with lactone; and
   (B) 20–80 wt. % of at least one epoxy-functional crosslinking component, said epoxy-functional crosslinking component being comprised of at least one epoxy-functional crosslinking component (B1) dissolved in the continuous phase of the coating composition and at least one epoxy-functional crosslinking polymer microparticle (B2) dispersed in the continuous phase of the coating composition, wherein a numerical ratio of epoxy groups of the epoxy-functional crosslinking component (B1) to epoxy groups of the epoxy-functional crosslinking polymer microparticle (B2) ranges from 10:1 to 1:5;
   wherein the numerical ratio of carboxy-functional component (A) to epoxy-functional crosslinking component (B) ranges from 1:1 to 1:3;
   wherein the organic solvents in the coating composition comprise 0–35 wt. % of at least one oxygen containing conventional organic lacquer solvent and 65–100 wt. % of at least one conventional lacquer hydrocarbon;
   whereby the coating composition is stabilized against sagging by said epoxy-functional crosslinking polymer microparticles (B2).

2. The coating composition according to claim 1, wherein the epoxy-functional crosslinking polymer microparticles (B2) have a particle size range of 200 nm to 2 μm.

3. The coating composition according to claim 1, wherein the epoxy-functional crosslinking polymer microparticle (B2) consists essentially of epoxy-functional (meth)acrylic copolymers.

4. The coating composition according to claim 1, wherein the epoxy-functional crosslinking polymer microparticle (B2) is covalently bonded to a dispersion stabilizer, said dispersion stabilizer being soluble in the continuous phase of the coating composition.

5. The coating composition according to claim 1, further comprising a pigment.

6. The coating composition according to claim 1, further comprising an extender.

7. The coating composition according to claim 1, further comprising a conventional lacquer additive.

8. The coating composition according to claim 1, wherein the oxygen containing conventional organic solvents are selected from the group consisting of ketones, esters, alcohols, ether esters, ethers, ether alcohols, and ester alcohols.

9. The coating composition according to claim 1, wherein the conventional lacquer hydrocarbons are selected from the group consisting of aromatic hydrocarbons, araliphatic hydrocarbons, aliphatic hydrocarbons, cycloaliphatic hydrocarbons and conventional terpene lacquer hydrocarbons.

10. The coating composition according to claim 1, wherein the organic solvent comprises 0–35 wt. % of the oxygen containing conventional organic-solvents; 50–90 wt. % of the conventional lacquer hydrocarbons, said conventional lacquer hydrocarbons being aromatic hydrocarbons or araliphatic hydrocarbons, or a combination thereof; and 5–30 wt. % of the conventional lacquer hydrocarbons, said conventional lacquer hydrocarbons being aliphatic hydrocarbons or cycloaliphatic hydrocarbons, or a combination thereof.

11. The coating composition according to claim 1, further comprising 0–30 wt. % of at least one polymer polyol (C), relative to a solids content by weight of components (A), (B1), and (B2).

12. The coating composition according to claim 11, further comprising 0–20 wt. % of at least one additional crosslinking agent (D), relative to the solids content by weight of components (A), (B1), (B2) and (C).

13. The coating composition according to claim 1 further comprising 0–10 wt. % of at least one monoepoxide, relative to the solids content by weight of components (A), (B1), and (B2).

14. The coating composition according to claims 11, 12, or 13, wherein the solids content of the coating composition is 40–70 wt. %.

15. The process for producing a multilayer lacquer coating comprising the steps of:
(a) applying a base lacquer layer to an optionally precoated substrate; and
(b) applying a clear lacquer layer over said base lacquer layer;
wherein the clear lacquer layer is comprised of the coating composition according to claim 1.

16. A substrate coated with the composition according to claim 1.

17. The substrate according to claim 16, wherein the substrate is a motor vehicle or part thereof.

* * * * *

UNITED STATES PATENT AND TRADEMARK OFFICE
CERTIFICATE OF CORRECTION

PATENT NO.   : 6,555,176 B1
DATED        : April 29, 2003
INVENTOR(S)  : Ralf Dahm et al.

It is certified that error appears in the above-identified patent and that said Letters Patent is hereby corrected as shown below:

Column 8,
Line 23, the phrase "preferably between" should read -- preferably between 10:90 and 30:70 --.

Column 11,
Line 2, the words "amino plastic" should read -- aminoplastic --.

Column 17,
Line 37, the phrase "mixture a benzotriazole" should read -- mixture of a benzotriazole --.

Signed and Sealed this

Sixteenth Day of September, 2003

JAMES E. ROGAN
*Director of the United States Patent and Trademark Office*